United States Patent
Ashkenazi et al.

(10) Patent No.: US 11,106,721 B2
(45) Date of Patent: Aug. 31, 2021

(54) LINE-OF-SIGHT-BASED CONTENT-SHARING DYNAMIC AD-HOC NETWORKS

(71) Applicant: EVERYSIGHT LTD., Haifa (IL)

(72) Inventors: Asaf Ashkenazi, Haifa (IL); Hanan Shamir, Haifa (IL)

(73) Assignee: EVERYSIGHT LTD., Haifa (IL)

( * ) Notice: Subject to any disclaimer, the term of this patent is extended or adjusted under 35 U.S.C. 154(b) by 0 days.

(21) Appl. No.: 16/072,515

(22) PCT Filed: Jan. 25, 2017

(86) PCT No.: PCT/IL2017/050097
§ 371 (c)(1),
(2) Date: Jul. 25, 2018

(87) PCT Pub. No.: WO2017/130198
PCT Pub. Date: Aug. 3, 2017

(65) Prior Publication Data
US 2019/0042575 A1 Feb. 7, 2019

(30) Foreign Application Priority Data
Jan. 25, 2016 (IL) .......................................... 243772

(51) Int. Cl.
*G06K 9/46* (2006.01)
*H04W 4/02* (2018.01)
(Continued)

(52) U.S. Cl.
CPC .......... *G06F 16/434* (2019.01); *A42B 3/0433* (2013.01); *A42B 3/30* (2013.01);
(Continued)

(58) Field of Classification Search
CPC ...... G06F 16/434; G06F 1/1686; G06F 3/012; G06F 3/011; G06F 16/487; G06F 1/163;
(Continued)

(56) References Cited

U.S. PATENT DOCUMENTS 8,229,163 B2  7/2012 Coleman et al.
8,442,922 B2  5/2013 Martin
(Continued)

FOREIGN PATENT DOCUMENTS

WO  WO 2014/185885  11/2014

OTHER PUBLICATIONS

International Search Report of PCT Application No. PCT/IL2017/050097, dated May 11, 2017.

*Primary Examiner* — Bobbak Safaipour
(74) *Attorney, Agent, or Firm* — Pearl Cohen Zedek Latzer Baratz LLP

(57) ABSTRACT

Methods, systems and wearable devices are provided, which are associated with users in communicating group(s). Devices receive or derive their position, calculate their device axis orientation with respect to an axis of a reference frame and a line of sight (LOS) of associated component(s) or user, and deliver specified data to other users according to their position with respect to the LOS and predefined rules. The systems may be configured to understand the nature of the situation and to enable automatic sharing of relevant digital information among the users within a dynamic network according to specified criteria (e.g., thresholds). Pictures and videos may be shared automatically with the relevant friends assuming that those friends are within the position and orientation of the taken image, linked within a private network to the user sharing the image, and approved to receive such data from the network.

20 Claims, 9 Drawing Sheets

(51) Int. Cl.
| | |
|---|---|
| *G06F 16/432* | (2019.01) |
| *G06F 1/16* | (2006.01) |
| *H04W 4/029* | (2018.01) |
| *G06F 16/487* | (2019.01) |
| *A42B 3/04* | (2006.01) |
| *G06F 3/01* | (2006.01) |
| *G02B 27/01* | (2006.01) |
| *A42B 3/30* | (2006.01) |
| *G01C 21/16* | (2006.01) |
| *G09G 3/00* | (2006.01) |
| *G06K 9/20* | (2006.01) |
| *H04L 29/08* | (2006.01) |
| *H04N 5/247* | (2006.01) |
| *H04W 4/06* | (2009.01) |

(52) U.S. Cl.
CPC ......... *G01C 21/165* (2013.01); *G02B 27/017* (2013.01); *G02B 27/0172* (2013.01); *G06F 1/163* (2013.01); *G06F 1/1686* (2013.01); *G06F 3/011* (2013.01); *G06F 3/012* (2013.01); *G06F 16/487* (2019.01); *G06K 9/20* (2013.01); *G06K 9/4609* (2013.01); *G09G 3/00* (2013.01); *H04W 4/023* (2013.01); *H04W 4/026* (2013.01); *H04W 4/029* (2018.02); *G02B 2027/0187* (2013.01); *H04L 67/06* (2013.01); *H04N 5/247* (2013.01); *H04W 4/06* (2013.01)

(58) Field of Classification Search
CPC ...... G06K 9/4609; G06K 9/20; G02B 27/017; G02B 2027/0187; G02B 27/0172; H04W 4/029; H04W 4/026; H04W 4/06; H04W 4/023; H04L 67/06; G01C 21/165; A42B 3/30; A42B 3/0433; G09G 3/00; H04N 5/247
See application file for complete search history.

(56) References Cited

U.S. PATENT DOCUMENTS

| | | | |
|---|---|---|---|
| 8,767,081 | B2 | 7/2014 | Kaheel et al. |
| 9,009,596 | B2 | 4/2015 | Ortiz |
| 9,026,596 | B2 | 5/2015 | Perez et al. |
| 9,761,055 | B2 * | 9/2017 | Miller ............... G02B 27/0101 |
| 2011/0271213 | A1 | 11/2011 | Newman et al. |
| 2012/0233000 | A1 | 9/2012 | Fisher et al. |
| 2012/0324589 | A1 | 12/2012 | Nukala et al. |
| 2013/0194304 | A1 | 8/2013 | Latta et al. |
| 2014/0294361 | A1 | 10/2014 | Acharya et al. |
| 2015/0006637 | A1 | 1/2015 | Kangas et al. |
| 2015/0215613 | A1 | 7/2015 | King et al. |
| 2016/0202947 | A1 * | 7/2016 | Ramalingam ......... G09G 3/001 345/156 |

* cited by examiner

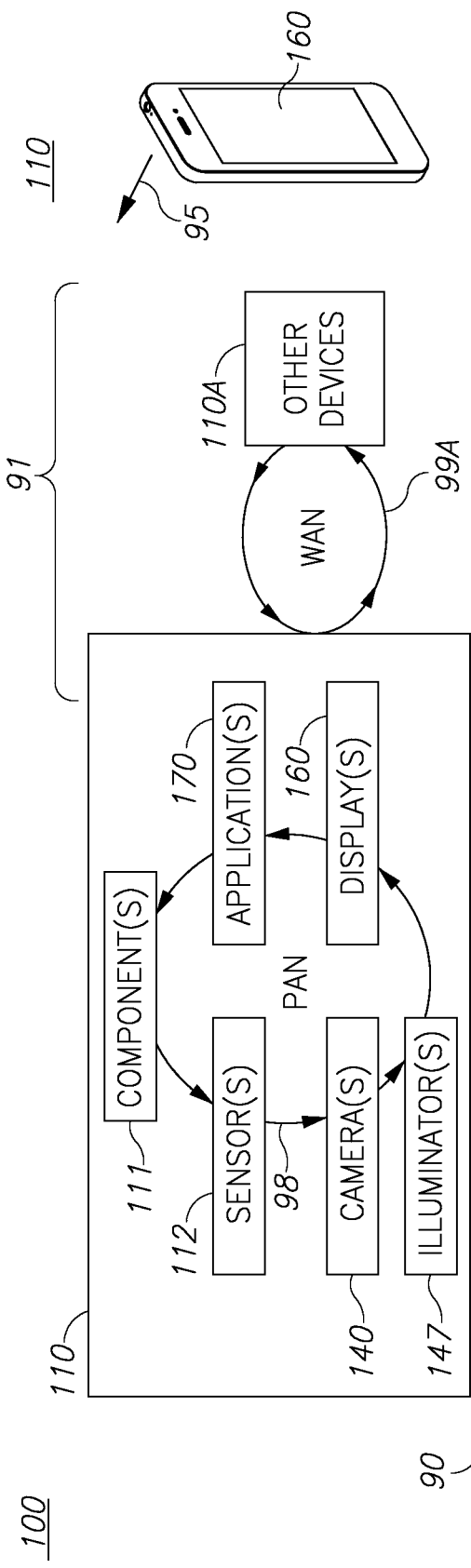
Figure 1B
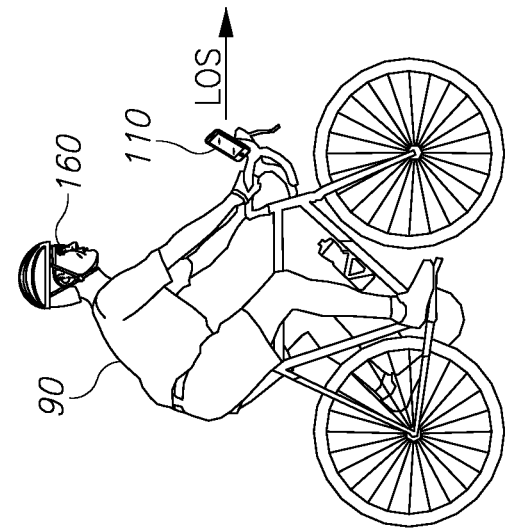
Figure 1F
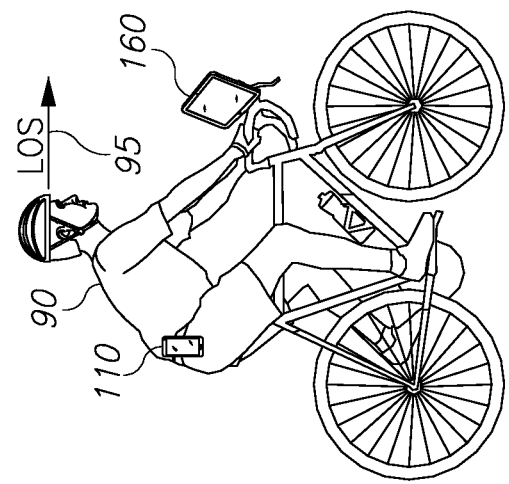
Figure 1D
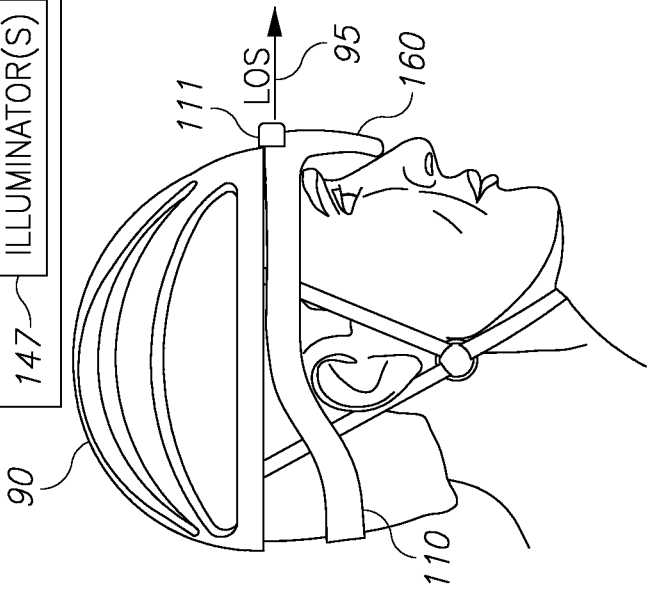
Figure 1E
Figure 1C

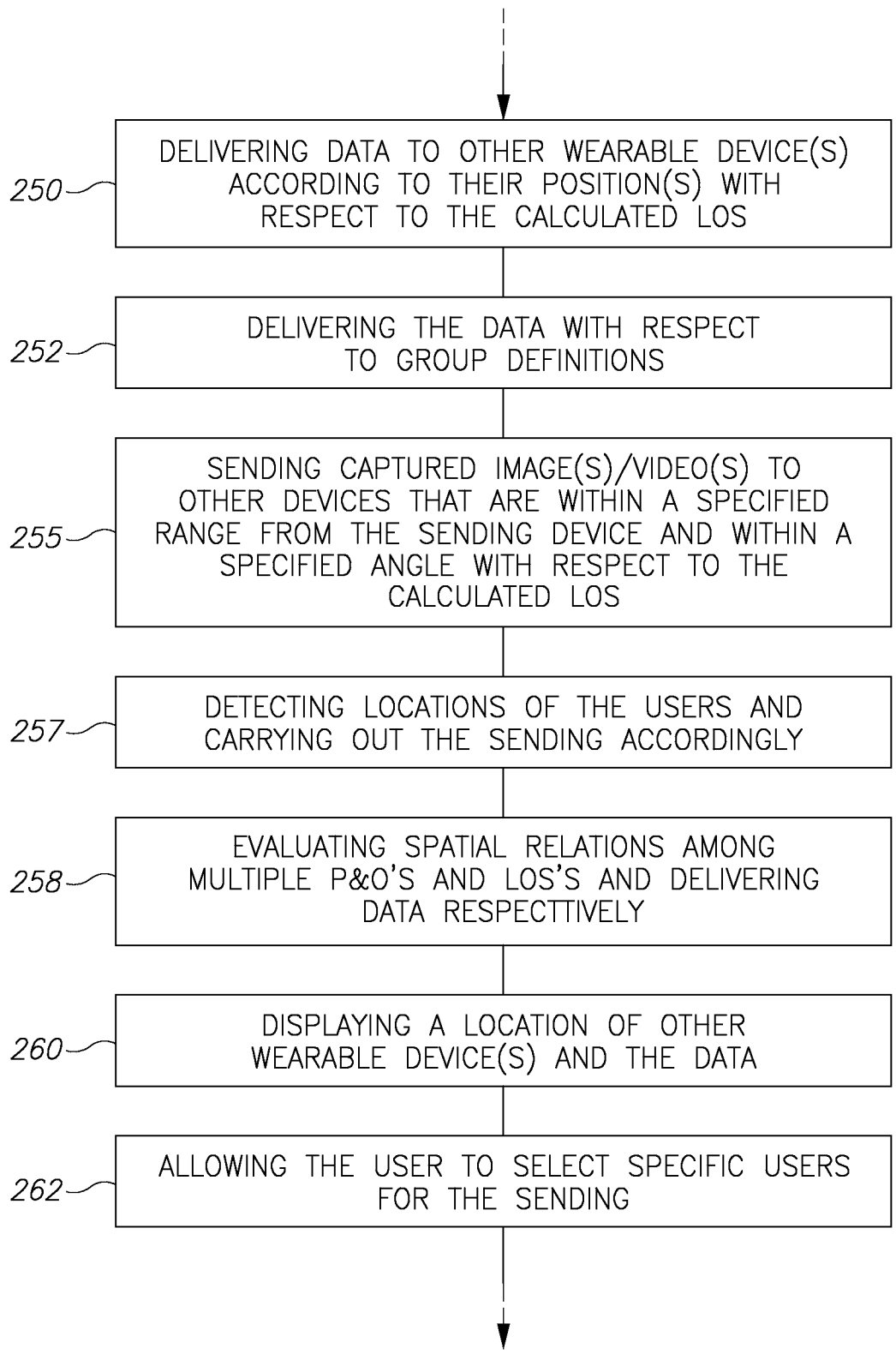
Figure 3 (cont. 1)

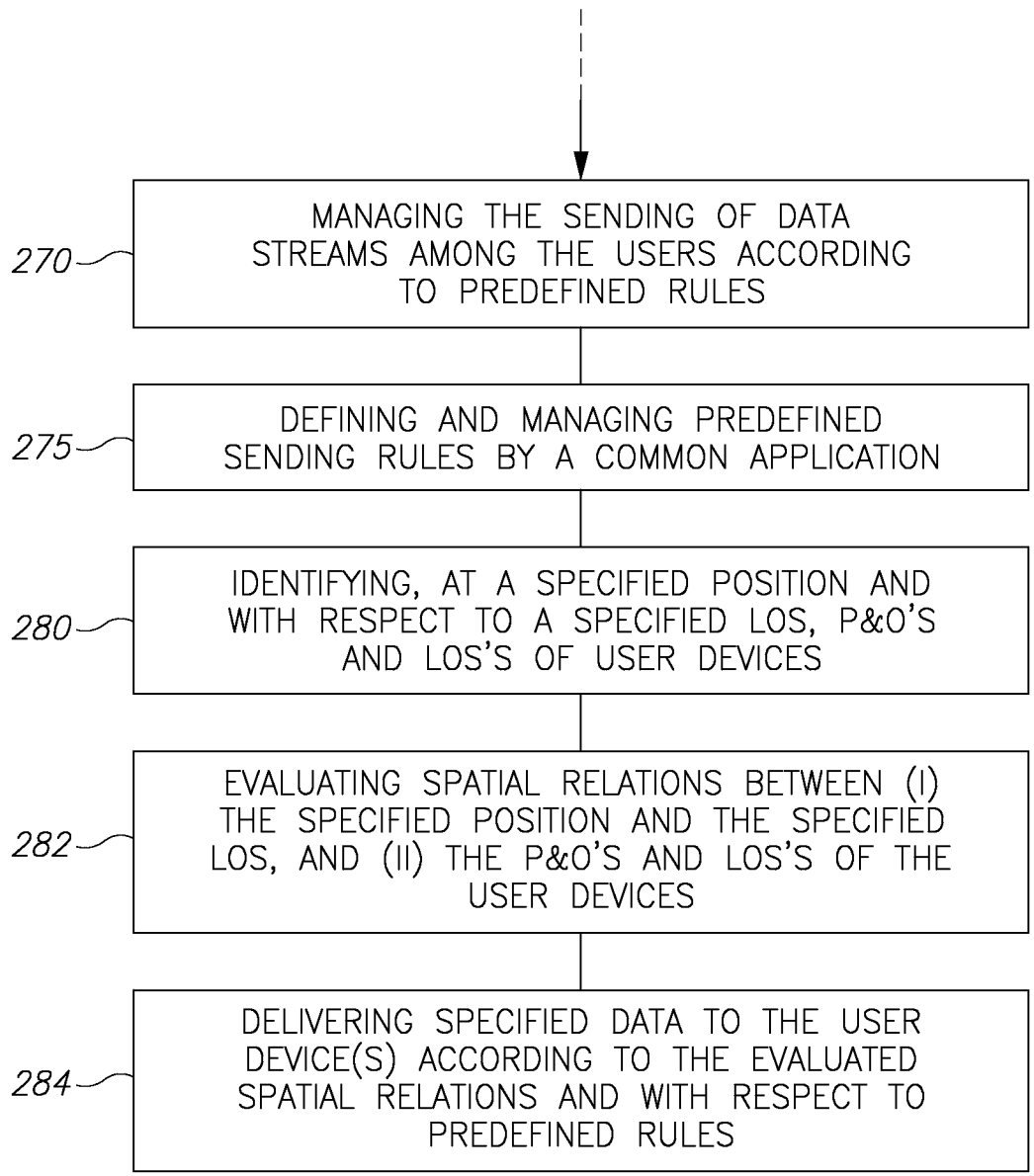
Figure 3 (cont. 2)

LINE-OF-SIGHT-BASED CONTENT-SHARING DYNAMIC AD-HOC NETWORKS

CROSS-REFERENCE TO RELATED APPLICATIONS

This application is a National Phase Application of PCT International Application No. PCT/IL2017/050097, International Filing Date Jan. 25, 2017, entitled "LINE-OF-SIGHT-BASED CONTENT-SHARING DYNAMIC AD-HOC NETWORKS", published on Aug. 3, 2017 under Publication No. WO 2017/130198, which claims priority of Israel Patent Application No. 243772, filed Jan. 25, 2016, all of which are hereby incorporated by reference in their entireties

BACKGROUND OF THE INVENTION

1. Technical Field

The present invention relates to the field of wearable devices, and more particularly, to dynamic ad-hoc networks among such devices.

2. Discussion of Related Art

Many networks and network applications enable access to numerous interconnected users that can share information according to user definitions. When relating to specific event, it is common that users register to specific groups dedicated to the event. For example, U.S. Patent Publication No. 2015/0006637, which is incorporated herein by reference in its entirety, discloses a method of sharing media between end users, which includes defining an event for which media is to be shared, registering event data at end user devices, and sharing captured media according to user definitions. In another example, U.S. Pat. No. 9,009,596, which is incorporated herein by reference in its entirety, discloses a media content presentation system receiving a plurality of timestamped and geotagged media content instances generated during a live event by a plurality of attendees of the live event, detecting input provided by a user specifying a time period associated with the live event and input provided by the user specifying a viewing area within a venue associated with the live event, identifying one or more media content instances that have a timestamp included within the specified time period and a geotagged location within the specified viewing area, and presenting the identified one or more media content instances to the user within a graphical user interface in a manner that is temporally synchronized with an event timeline associated with the live event. Similar approaches in this respect, which are incorporated herein by reference in their entirety, include disclosures of U.S. Pat. Nos. 8,442,922, 9,026,596 and 8,767,081 and of U.S. Patent Publication Nos. 2011/0271213 and 2012/0324589.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a wearable device, associated with a user being a member of at least one communicating group of users with respective wearable devices, the wearable device comprising: a position and orientation (P&O) module configured to: receive or derive a position of the wearable device, calculate a device axis orientation of the wearable device with respect to an axis of a reference frame, and calculate a line of sight (LOS) of at least one component associated with the wearable device with specified P&O, the LOS calculation being carried out with respect to a scene and based on: the received or derived position of the wearable device, the calculated device axis orientation of the wearable device, and the specified P&O of the at least one component, and a communication module configured to deliver specified data to at least one other wearable device of a respective at least one other user of the at least one communicating group, according to a relation between a position of the other wearable device and the calculated LOS and device position, wherein the relation is specified by predefined rules.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 1A and 1B are high level schematic block diagrams of a wearable device in a system, according to some embodiments of the invention.

FIGS. 1C-1F are high level schematic illustrations of various configurations of the wearable device, according to some embodiments of the invention.

DETAILED DESCRIPTION OF THE INVENTION

Figure 1A:
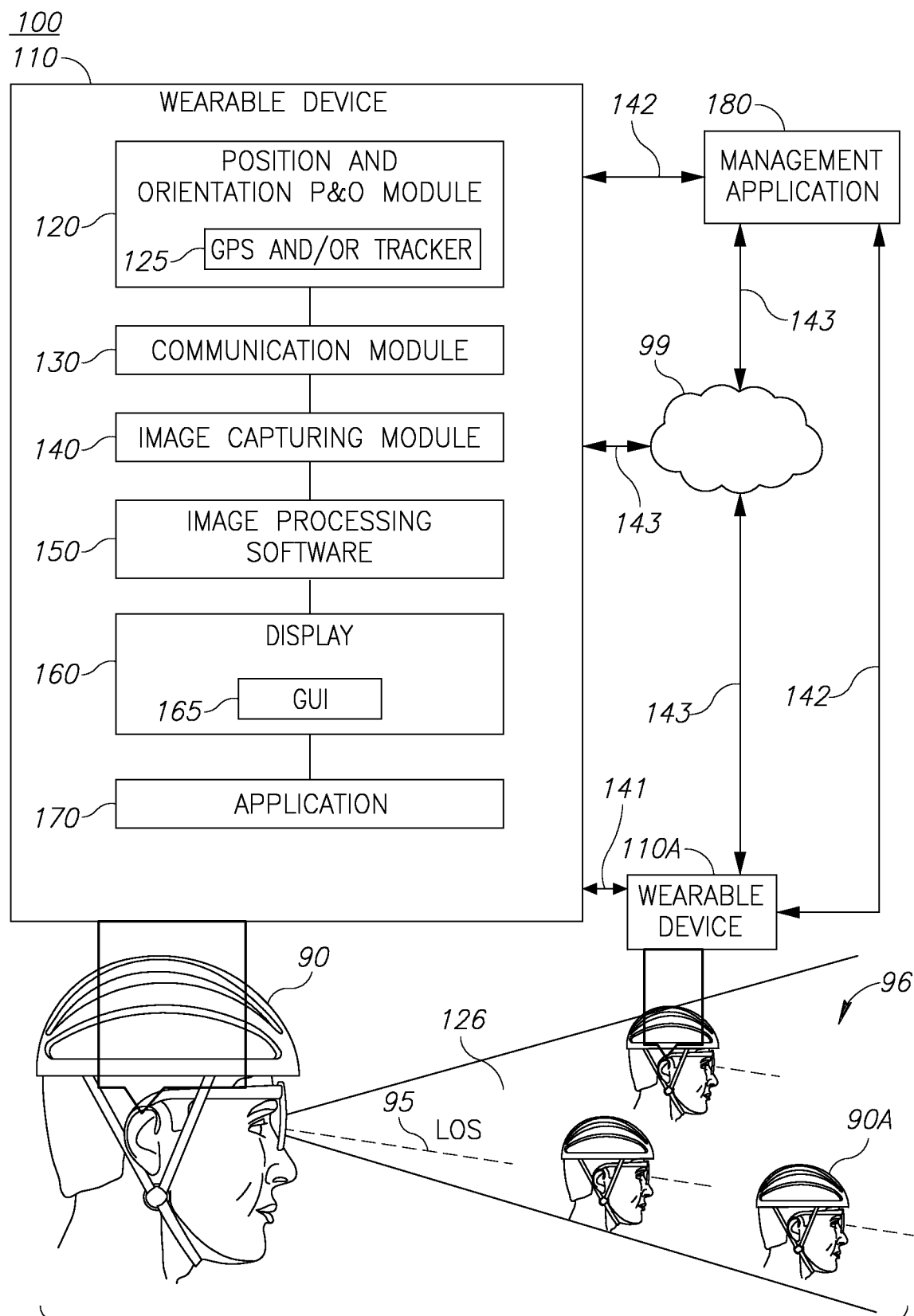

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Methods, systems and wearable devices are provided, which are associated with users in communicating group(s) and enable ad-hoc dynamic networks with seamless interaction and data sharing. Devices receive or derive their position, calculate their device axis orientation with respect to an axis of a reference frame and a line of sight (LOS) of associated component(s) or user, and deliver specified data to other users according to their position with respect to the LOS and predefined rules. The systems may be configured to understand the nature of the situation and to enable automatic sharing of relevant digital information among the users within a dynamic network according to specified criteria (e.g., thresholds). Pictures and videos may be shared automatically with the relevant friends assuming that those friends are within the position and orientation of the taken image, linked within a private network to the user sharing the image, and approved to receive such data from the network.

FIGS. 1A and 1B are high level schematic block diagrams of a wearable device 110 in a system 100, according to some embodiments of the invention. FIGS. 1C-1F are high level schematic illustrations of various configurations of wearable device 110, according to some embodiments of the invention. Wearable device 110 is associated with a user 90 being a member of at least one communicating group 91 of users 90A with respective wearable devices 110A (the distinction between numerals 110 and 110A is merely to specify an arbitrary focal device and other devices, respectively, and is not limiting in any sense, as any of the devices may be considered a focal device).

Each wearable device 110 comprises a position and orientation (P&O) module 120, which is configured to: (i) receive or derive a position of wearable device 110, calculate a device axis orientation of wearable device 110 with respect to an axis of a reference frame, calculate a line of sight (LOS) 95 of at least one component 111 associated with wearable device 110 with specified P&O. The reference frame may be external to the users, such as the earth, or be specific to one or more users such as environments in which the users are (e.g., rooms, specific geographical locations, etc.), within respective vehicles, or even the users themselves. The reference frame may be common to users in the communicating group or may be user-specific. Device 110 and/or system 100 may be configured to convert coordinates and directions between reference frames of the users, when these differ.

The LOS calculation may be carried out with respect to a scene 96 and is based on the calculated device axis orientation of wearable device 110 and on the specified P&O of at least one component 111. For example, P&O module 120 may be configured to derive the position of wearable device 110, e.g., using a GPS (global positioning system) module and/or via a tracker 125 such as an inertial tracker. GPS module 125 may implement any type of GPS navigation (e.g., GPS, GLONASS (global navigation satellite system), A-GPS (assisted GPS), Dead Reckoning etc.). Tracker 125 may be further configured to track LOS 95 of user 90, and P&O module 120 may be configured to use tracked user's LOS 95 in place of calculated component LOS 95 (see FIG. 1D and FIG. 1C below, respectively). Using the location data of devices 110 and the respective vector LOS data provides the spatial relations among the users with respect to their device 110 and LOSs 95. Wearable device 110 comprises a communication module 130 configured to deliver specified data to at least one other wearable device 110A of respective at least one other user 90A of at least one communicating group 91, according to a relation between a position of other wearable device 110A and calculated LOS 95, wherein the relation is specified by predefined rules. The predefined rules may relate to spatial and temporal relations as well as to application based rules with relation to the users' identities, locations and LOSs. The specified data may be delivered directly from wearable device 110 to other wearable device 110A (141), be delivered via a communication link 99 (143) and/or by a management application 180, possibly after further processing. Management application 180 may also implement a network 142 among devices 110 that does not involve communication link 99 (see below).

FIG. 1B schematically illustrates complementary aspects of wearable device 110 and system 100, and any combination of FIGS. 1A and 1B may also be considered an embodiment of the current invention. Wearable device 110 may comprise any number of components 111 associated therewith wherein at least one component 111 may be used for calculating the LOS. Device 110, e.g., via application 170, may be configured to convert among coordinate systems defined by scene 96, user 90, device 110 and/or any of component(s) 111. For example, LOS 95 may be calculated in component coordinates and then converted into scene coordinates. The selection of coordinate systems for LOS calculation and for the calculation of the spatial relations between users may be static or may be modified dynamically. Component(s) 111 may comprise any one of the elements of device 100, such as sensor(s) 112, camera(s) 140 (as a non-limiting example for image capturing device(s) 140), display(s) 160, tracker(s) 125, illuminator(s) 147 (e.g., a user activated designator), compass(es), 3D audio microphones etc. For example, component 111 may comprise camera 140 (e.g., forward looking) with LOS 95 defined with respect to a line perpendicular to the camera's detector, sensor 112 with LOS 95 defined with respect to a main lobe and/or a specified sensing sector (or angular range) of sensor 112 and so forth. The calculation of LOS 95 may change dynamically with respect to component 111 as well as with respect to the identity of component 111 (i.e., LOS 95 may be calculated with respect to different components 111, simultaneously to yield one or more LOSs and/or sequentially). It is explicitly noted that any component of device 110 may operate with respect to its own LOS (or irrespective to any direction), and device 110 may be configured to relate each of these directions to LOS 95.

Communication module 130 and/or application 170 may support a personal area network (PAN) 98 among elements and components associated with one user 90, such as components 111, sensors 112, image capturing devices 140, displays 160, illuminators 147 (e.g., a laser designator) etc. For example, sensors 112 may comprise sensor that measure physiological parameters of user 90 (e.g., pulse, breathing rate, oxygen saturation, temperature etc.) and application 170 may be configured to monitor and/or these physiological parameters, and possibly to provide alerts and/or communicate data related to them under specified conditions. Communication module 130 and/or application 170 may support a wide area network (WAN) 99A among users 90, 90A of communicating group 91. WAN 99A may be implemented using communication link 99 or in addition thereto. WAN 99A may be implemented using wireless communication such as cellular communication, or at least partially using wireless communication of any type. Managing application 180 may be further configured to realize WAN 99A without use of any communication link but directly via device to device communication 142, e.g., for a case of reduced coverage by communication link 99.

Network 99A among the at least one communicating group 91 may be any of a dynamic, a local, a temporary and an ad-hoc (point to point) network that utilizes parameters relating to the user's existing situation (e.g., location, time, head and eye orientations, and status such sitting, standing, walking, running, cycling, driving, etc.), indications of health monitoring sensors, user predefined data (such as gender, age, address, hobbies, etc.) and setup data (social contacts, family contacts, work contacts, sharing level mechanism—such as share all, shall best image/video, smart share—sharing only if the user in the picture). System 100 may relate to any of the following: real time data (e.g., user data such as location, altitude, time, head line of sight, eye line of sight; sensor data such as barometer, accelerometer, power, cadence, speed, shifter location; bio data such as heart rate, pulse oximetry; connectivity information such as Bluetooth (regular or low energy), WiFi, cellular etc.), predefined data (e.g., gender, age, height, weight, heartrate range), social data (e.g., contact list, social channels, priority list, emergency list) and system-specific data (e.g., identification code, sharing policy, privacy policy, location-based-service policy, authentication policy, payment policy).

The predefined rules may relate to at least one of: a distance to other wearable device 110A, an angular relationship (e.g., angle with respect to LOS, possibly relating also to distances and/or defined sectors with respect to the LOS) between other wearable device 110 and calculated LOS 95, an identity of other user 90A, a status of other user 90A within at least one communicating group 91 of users, a priority of other user 90A, a priority related to the specified data, and temporal parameters relating to each thereof. The predefined rules may be received from an application 170 in wearable device 110 and/or from management application 180 to which all wearable devices 110A are connected, e.g., via communication link 99. The predefined rules may relate to temporal parameters such as locations of specific users at specific times, possibly including specified delays (e.g., for delivering data to users 90A that arrive at a location after user 90). Spatial relations to user locations and LOSs may be time-based, so that data may be delivered to other users based on the spatio-temporal characteristics of their positions and LOSs.

Wearable device 110 may further comprise an image capturing module 140 configured to capture at least one image (possible a data stream, a video, etc.) along LOS 95 and the delivered specified data may comprise the at least one image. Capturing module 140 as well as any other component of device 110 may operate along any direction (as the LOS of the respective component), and such directions may be related to with respect to LOS 95.

Wearable device 110 may further comprise an image processing software 150 configured to enable processing of the at least one image prior to its delivery.

Wearable device 110 may further comprise a display 160 with a graphical user interface (GUI) 165, configured to display a location of at least one other wearable device 110A and the specified data, and to enable selection of recipient users 90A. User selection of recipient users 90A may be used on top of the predefined rules.

As illustrated in FIGS. 1C-1F, wearable device 110 may be configured as a head-mounted device (FIG. 1C) having LOS parallel 95 to a LOS of user 90 wearing device 110. For example, when wearable device 110 is in a form of glasses, component 111 may be positioned at its front, display 160 may be incorporated in or projected on the glasses or lenses, and modules 120, 130, 140 and GUI 165 may be integrated in the frame. Wearable device 110 may be incorporated in any communication device (FIG. 1D), with any type of P&O module 120 configured to track user's LOS 95 by any means. Display 160 may be part of the communication device or a separate unit associated or communicating with the communication device. Wearable device 110 may be a forward looking device mounted on a vehicle user 90 rides (FIG. 1E) and LOS 95 may be calculated with respect to the vehicle. User 90 may have display 160 on glasses, display 160 communicating with the forward looking device. In certain embodiments, elements of wearable device 110 may even be detached from the terrain, e.g., be airborne, while LOS 95 may be determined by the respective user's LOS. Wearable device 110 may be a cellphone, tablet, etc. (FIG. 1F) with display 160, configured to have LOS 95 determined by any of various parameters such as orientation with respect to device 100, with respect to display 160, with respect to components of device 110 (e.g., camera, sensors etc.) or any other user defined direction. It is explicitly noted that the term "wearable" is understood in a general sense as any association of device 110 with a user, a vehicle or even a location. The term "wearable" merely denotes a common yet non-limiting physical association between device 110 and a user or a vehicle associated with the user.

The delivering of the specified data with respect to calculated LOS 95 may be carried out only at a specified sector 126 of scene 96, defined e.g., by a specified angle with respect to LOS 95 and/or by a specified distance with respect to a position of wearable device 110. Specified (angular) sector 126 may be adjusted by any of user 90, management application 180, e.g., according to various parameters such as the user's behavior or activity, terrain characteristics, and definitions of communicating group(s) 91. Non-limiting examples for sector 126 may comprise, e.g., in a range between 30° and 150° over ranges up to a few hundred meters for static users, in a range between 100° and 240° over similar ranges for dynamic users with cameras that capture up to 120°. Larger sectors, up to 360°, may be used, e.g., with cameras having a field of view of 360°. Smaller sectors, down to a few degrees, may be used, e.g., with cameras having a narrow field of view, in which case the distance may increase to one or more km.

Wearable device 110 may be part of system 100, which comprises multiple wearable devices 110, 110A of various users 90, 90A, and management application 180 in communication with communication modules 130 in wearable devices 110, 110A. Management application 180 may be configured to manage the sending of data streams comprising the specified data among communication modules 130 according to the predefined rules.

Devices 110, 110A in system 100 may comprise respective image capturing modules 140 configured to capture at least one image along respective LOSs 95 of respective users 90A, or along any other direction, and management application 180 may be further configured to compose composite(s) image or video(s) from multiple captured images received from one or more wearable devices 110, 110A according to tempo-spatial parameters of users 90A that relate to the captured images and the LOSs. Management application 180 may be further configured to compose the composite image(s) or video(s) with respect to any of: specified user(s) 90A, e.g., one depicted in multiple images; specific captured image(s), e.g., enhancements such as capturing similar images at different times or from different angles; tempo-spatial trail(s), e.g., along a trail common to all users; and/or a location, e.g., a panoramic view of a captured scene. The composite image(s) or video(s) may be processed in real time or after an event, by any of the users and/or by management application 180, e.g., using a lookup table stating the positions and captured images relating to each of the user over the time of the event.

Management application 180 may be further configured to define and manage the users' predefined rules with respect to the delivering of the specified data. For example, user priorities, connected friends, geographical data and any other preferences may be used to adjust the predefined rules.

Figure 2A:
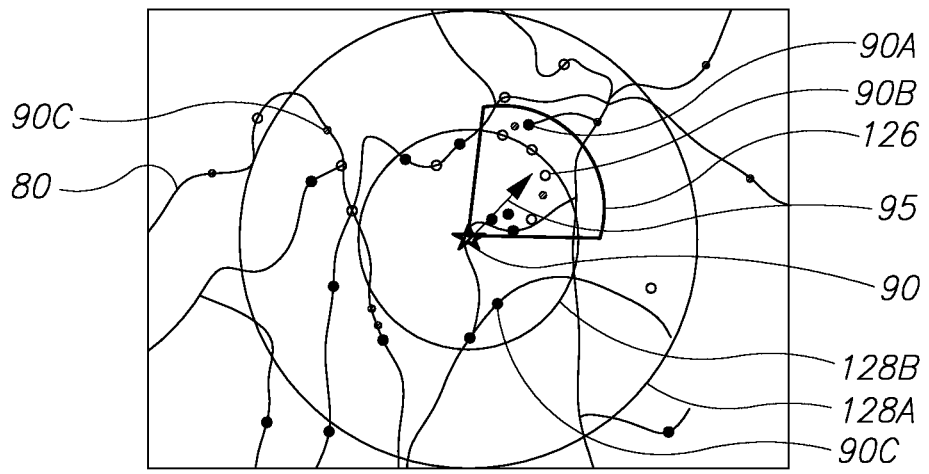
FIG. 2A-2D are high level schematic illustrations of use scenarios, according to some embodiments of the invention.
Figure 2B:
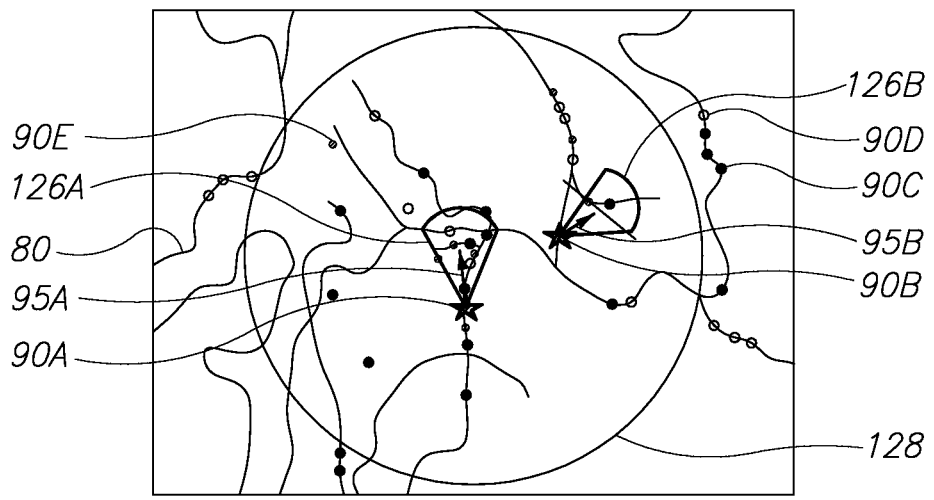
Figure 2C:
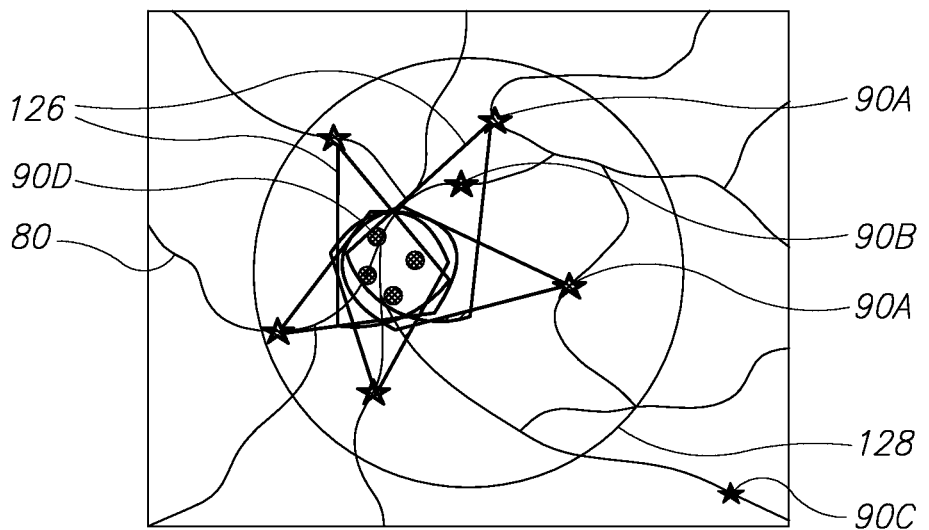

FIG. 2A-2D are high level schematic illustrations of use scenarios, according to some embodiments of the invention. FIGS. 2A-2C illustrate top view of various scenes that include multiple trails 80 with users 90, 90A, 90B, 90C, 90D on trails 80. Certain users 90 (FIG. 2A), 90A and 90B (FIG. 2B) and 90A (FIG. 2C) are referred to in a non-limiting manner as the focal users (indicated by respective stars) with wearable device 110, and their specified sectors 126, 126A and 126B, and 126, respectively, are illustrated in a schematic manner (clearly specified sectors may be variable and also vary between users). Other users 90A (FIG. 2A) and 90C (FIG. 2B) are indicated in a non-limiting manner as users (indicated by full black circles) having wearable devices 110A, belonging to communication group(s) 91 with the focal users, and being specifically associated with the focal users, e.g., as connected friends in the context of managing application 180. Yet other users 90B (FIG. 2A) and 90D (FIG. 2B) are indicated in a non-limiting manner as users (indicated by empty circles) having wearable devices 110A, belonging to communication group(s) 91 with the focal users, but not being specifically associated with the focal users, i.e., not being connected friends in the context of managing application 180. Finally, users 90C (FIG. 2A) and 90E (FIG. 2B) are indicated in a non-limiting manner as users (indicated by small hatched circles) that may or may not have wearable devices 110A, and do not belong to communication group(s) 91 with the focal users. Clearly, the membership in communication group(s) 91 and the friend connections among users may be updated and modified according to specified rules, e.g., implemented by managing application 180. Display 160 and GUI 165 may present and allow user interaction with map similar to the ones presented in FIGS. 2A-2C to enable modification of the predefined rules, social interaction among users, etc.

Circles 128, 128A, 128B designate ranges of communication group(s) 91 with respect to the focal user (independent of, or possibly dependent on LOS. These ranges may define different aspects of the communication, such as maximal range of belonging to certain groups 91, ranges of inclusion of other users as connected friends, ranges for specific, possibly different types of data delivered from or to the focal user, different data delivery priorities etc. For example, in FIG. 2A, users outside circle 128A may not receive data from the focal user, users inside circle 128A but outside circle 128B may receive certain types of data, or receive data only when connected to the focal user as friends, and users inside circle 128B may receive more or all data, depending or not on their friend-connectivity with the focal user. Alternatively or complementarily, users within section 126 may be the only users receiving data from the focal user such as images or videos, while other users may only receive general data concerning the focal user (e.g., location, identity, etc.), depending on their range from the focal user. The dimensions of any of regions 126, 128, 128A, 128B may change dynamically, e.g., according to the speed of the focal user, characteristics of the terrain ahead, communication availability and parameters, etc. One or more of the regions may also be used to define participants of a specific event, distinguishing them from participant of other, possibly adjacent events. Exemplary non-limiting radii are hundreds of meters to 20 km for circle 128B and several km to infinity for circle 128A.

The rules and preferences for data delivery may depend on user characteristics such as speed of motion. For example, static users may have specific data delivery definitions (e.g., delivery within range 128A) while moving users, possibly above a specified velocity threshold, may have other specific data delivery definitions (e.g., delivery within sector 126). Data delivery may be carried out automatically upon certain user characteristics such as motion speed. Other users may receive the delivered data upon its delivery or later, depending on spatio-temporal criteria (e.g., such as entering a region that was previously or is currently covered by section 126 and/or circle 128A). In certain embodiments, the focal user may share with users or with connected friends in circle 128A low bandwidth data (e.g., real time meta data as location, time, speed, velocity vector, bio data) while sharing with users or with connected friends in sector 126, defined by the focal user's LOS, high bandwidth data (e.g., images and videos). In certain embodiments, data update rates may differ among regions 126, 128, 128A, 128B, e.g., low data update rates may apply to the low bandwidth data while higher update rates may apply to high bandwidth data, and/or update rate may depend on the velocity of the focal user. In case users lose temporarily connectivity to communication link 99 and/or to specific other users or connected friends, a smart dead reckoning mechanism in wearable device 110 may be configured to indicate the disconnection (e.g., by change of symbol color) and estimate the advancing of the disconnected user according to past movement data (such as location and speed). Close range 128B may define an area in which all or specific users receive specific types of data from the focal user, such as mission-related information (e.g., current or predefined information, such as navigational data or training data), under specific conditions (e.g., moving focal user), over management application 180 (142), directly (141) or directly via communication link 99 (143). Receiving users may receive notification prior to receiving actual data of any type and may approve or deny receiving the data. Data delivery may also be postponed to given times or to when the user is in a certain situation (location, not in movement, etc.). Management application 180 may be configured to prevent excessive data delivery to the users and optimize the available bandwidths with respect to user preferences concerning delivered data.

As illustrated in FIG. 2B, system 100 may handle multiple focal users 90A, 90B, each with respective sector 126A, 126B relating to respective LOS 95A, 95B. Regions 128 may be common to users 90A, 90B, or may vary (each be user-centered). System 100, e.g., via management application 180, may handle respective data delivery from multiple focal users to respective connected-friends to yield multiple data deliveries of different types, depending on the symmetric and asymmetric relationships among users.

In certain embodiments, one or more users may be defined as "super-users" which are connected to all users and/or receives all data, of one, some or all categories, from all users. Such "super-users" (other or same as system 100's manager) may have access to all geographical data concerning the users, all image data delivered from all users, and/or may select which data from which user to receive. "Super-users" may categorize the users according to various criteria (e.g., vehicle—riding or not, physiological parameters—heart-rate above a threshold etc.) and so monitor the participants of a respective event, identify emergencies or distresses of users, etc. A "super-user" may be defined as such with respect to low bandwidth and/or high bandwidth data.

As illustrated in FIG. 2C, a "super-user" (denoted 90C, by a full star) may be external to region 128 (in certain embodiments even detached from the terrain, e.g., be airborne) and yet receive all user data, directly from, e.g., management application 180 and/or other users 90A. Super-user 90C may define priorities for data delivery from users 90A, processes data delivered therefrom and deliver products to some or all other users (e.g., an edited composite video made of images and videos captured by multiple users 90A). For example, super-user 90C may guide users 90A to cover specified point of interest 90D, which may be users, locations, players etc. The guiding may be carried out using various geographic information, including geometric calculations, using LOS calculations, terrain characteristics etc. Super-user 90C may receive real time data as well as earlier capture images or data, and may select specific sources from required data or images, e.g., using a geographical lookup table that defined the users and their respective LOSs (e.g., user 90B may not be selected due to limited visibility of point of interest 90D from its position or with respect to its activity).

In certain embodiments, one or more users may be defined as "super-users" which are connected to all users and/or transmits data, of one, some or all categories, to all users. Such "super-users" may be certain users or certain users at certain states, e.g., a user in a distress state. System 100 may be configured to turn a user in distress automatically to a "super-user" and transmit relevant data to some or all users in the vicinity, to users specified as medical personnel, or according to any other definition. "Super-users" may be categorized according to various criteria (e.g., vehicle—riding or not, physiological parameters—heart-rate above a threshold etc.) and be effectively monitored by the other user via the system to identify emergencies, distress of users, etc. A "super-user" may be defined as such with respect to low bandwidth and/or high bandwidth data.

Figure 2D:
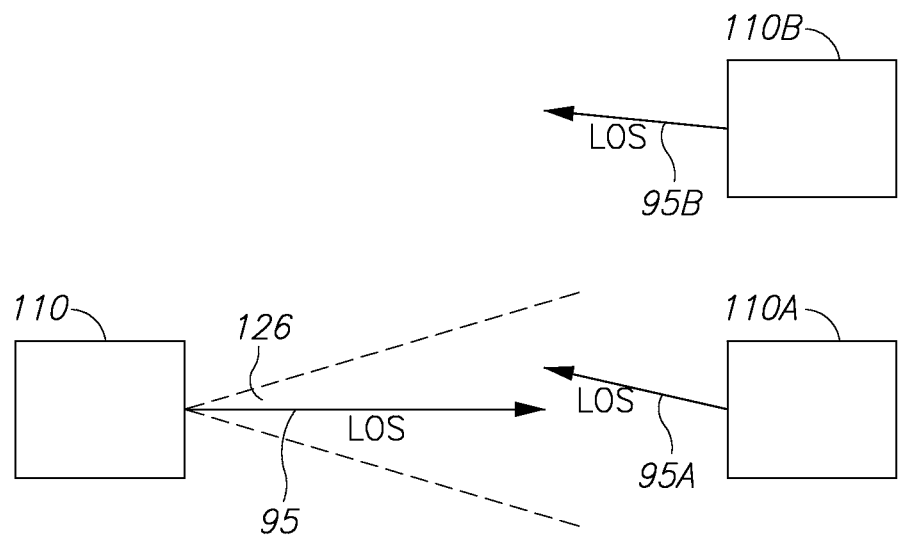

FIG. 2D is a high level schematic illustration of a multi-LOS operation mode of system 100, according to some embodiments of the invention. System 100, e.g., via management application 180, may be configured to evaluate spatial relations among multiple P&O's and LOS's 95, 95A, 95B associated with corresponding users and devices 100, 100A, 110B and send the data streams accordingly. For example, system 100 may deliver data only to devices with LOS's that are opposite to LOS 95, possibly taking into account the positions of devices 100, 100A, 110B to determine whether these are facing each other within specified angular range 126. Data transfer may be initialized and/or data enhancement may be sent upon detection of certain evaluated spatial relations. It is noted the this mode of operation may be implemented in commercial scene 96, e.g., with user 90 being a store that communicates with potential customers 90A by identifying the evaluated spatial relations with them to indicate that potential customers 90A are looking at the store, with LOSs 95 (of device 110 at the store) and 95A (of device 110 on potential customers 90A) pointing at east other within a specified angular range.

Figure 3:
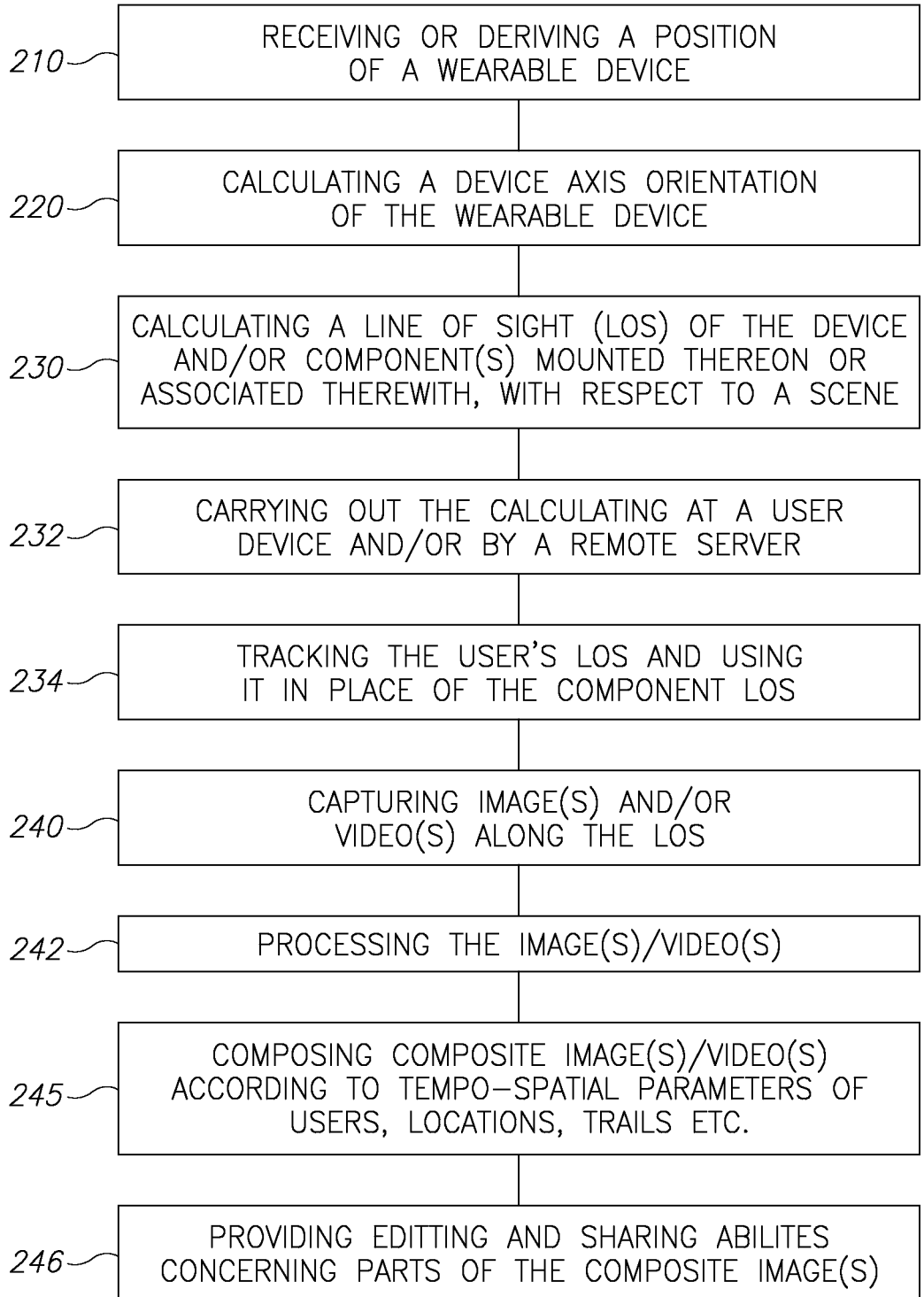
FIG. 3 is a high level flowchart illustrating a method, according to some embodiments of the invention.

FIG. 3 is a high level flowchart illustrating a method 200, according to some embodiments of the invention. Data processing stages of method 200 may be carried out at least partially by at least one processor. The method stages may be carried out with respect to system 100 described above, which may optionally be configured to implement method 200. Method 200 may be at least partially implemented by at least one computer processor. Certain embodiments comprise computer program products comprising a computer readable storage medium having computer readable program embodied therewith and configured to carry out of the relevant stages of method 200. Method 200 may comprise stages for producing, preparing and/or using system 100, such as any of the following stages, irrespective of their order.

Method 200 may comprise receiving or deriving a position of a wearable device (stage 210), the wearable device being associated with a user who is a member of at least one communicating group of users with respective wearable devices, and calculating a device axis orientation of the wearable device with respect to an axis of a reference frame (stage 220). Method 200 further comprises calculating a LOS of at least one component mounted on the wearable device with specified P&O and/or the LOS of the device itself (stage 230), carried out with respect to the scene, and based on the calculated device axis orientation of the wearable device and on the specified P&O of the at least one component. Method 200 further comprises delivering specified data to at least one other wearable device of a respective at least one other user of the at least one communicating group (stage 250), according to a relation between a position of the other wearable device and the calculated LOS and position, wherein the relation is specified by predefined rules. The predefined rules may relate to at least one of: a distance to the other wearable device, an angular relationship between the other wearable device and the calculated LOS, e.g., according to specified sector definitions, an identity of the other user, a status of the other user within the at least one communicating group of users, a priority of the other user, and a priority related to the specified data.

Method 200 may comprise managing the predefined rules by a common application to which all wearable devices are connected (stage 275) and generally managing the sending of data streams among the users according to predefined rules (stage 270).

Method 200 may comprise capturing at least one image along the LOS (stage 240), wherein the delivered specified data comprises the at least one image. The at least one image may be processed (e.g., modified and/or edited) prior to its delivery (stage 242). Method 200 may comprise composing a composite image or video from a plurality of images captured by and received from one or more wearable devices in the at least one communicating group (stage 245), according to tempo-spatial parameters of users that relate to the captured images, and with respect to at least one of: a specified user, a specific captured image, a tempo-spatial trail, and a location. Method 200 may further comprise providing editing and sharing abilities concerning parts of the composite image(s)/video(s), such as enabling users to classify, tag, catalog, edit and share parts or the whole of the composite image(s)/video(s) (stage 246), e.g., by maintaining a respective database.

Method 200 may comprise, using a display with a GUI, displaying a location of an at least one other wearable device and the specified data (stage 260), and to enable selection of recipient users (stage 262).

Method 200 may comprise tracking the user's LOS and using the tracked user's LOS in place of the calculated component LOS (stage 234). Any of the calculations (e.g., of stage 230) may be carried out at a user device (e.g., the wearable device) and/or by a remote server (stage 232).

Delivering 250 of the specified data with respect to the calculated LOS (e.g., sending the captured or processes images/videos) may be carried out at a specified angle with respect to the LOS and/or at a specified distance with respect to a position of the wearable device (stage 255). For example, the specified angle and distance may be defined as an angular sector with respect to device 110 and LOS 95. Method 200 may comprise detecting locations of the users and carrying out the sending accordingly (stage 257). Method 200 may further comprise evaluating spatial relations among multiple P&O's and LOS's and delivering the data accordingly (stage 258). For example, method 200 may provide communications, data delivery or data enhancements between users with LOS's that point to each other within a specified angular range.

Method 200 may comprise managing sending of data streams comprising the specified data among the wearable devices in the at least one communicating group, according to the predefined rules (stage 252). Method 200 may comprise defining and managing the users' predefined rules with respect to the delivering of the specified data.

In certain embodiments, method 200 may comprise identifying, at a specified position and with respect to a specified LOS, P&O's and LOS's of user devices (stage 280), evaluating spatial relations between (i) the specified position and the specified LOS, and (ii) the P&O's and LOS's of the user devices (stage 282) and delivering specified data to the user device(s) according to the evaluated spatial relations and with respect to predefined rules (stage 284). Delivering of the specified data 284 may be carried out at a specified angle with respect to the specified LOS and/or at a specified distance with respect to a position of the wearable device. Features described above concerning wearable device 110 and system 100 may be implemented to a static device that detects other devices according to their LOS's and communicates with the other devices accordingly.

Advantageously, systems 100 and methods 200 provide solutions for smart recognition systems that simplify sharing of images, video and other digital information within a dynamic ad-hoc network. Systems 100 and methods 200 may be configured to understand the nature of the situation (relating e.g., to user activity, bio data, location, camera position and orientation, etc.) and to enable automatic sharing of relevant digital information between a group of users within a dynamic network according to specified criteria (e.g., thresholds). For example, a user within the network can take a picture of group of people and that picture may be shared automatically with the relevant friends assuming that those friends are within the position and orientation of the taken image, linked within a private network to the user sharing the image, and approved to receive such data from the network.

Figure 4:
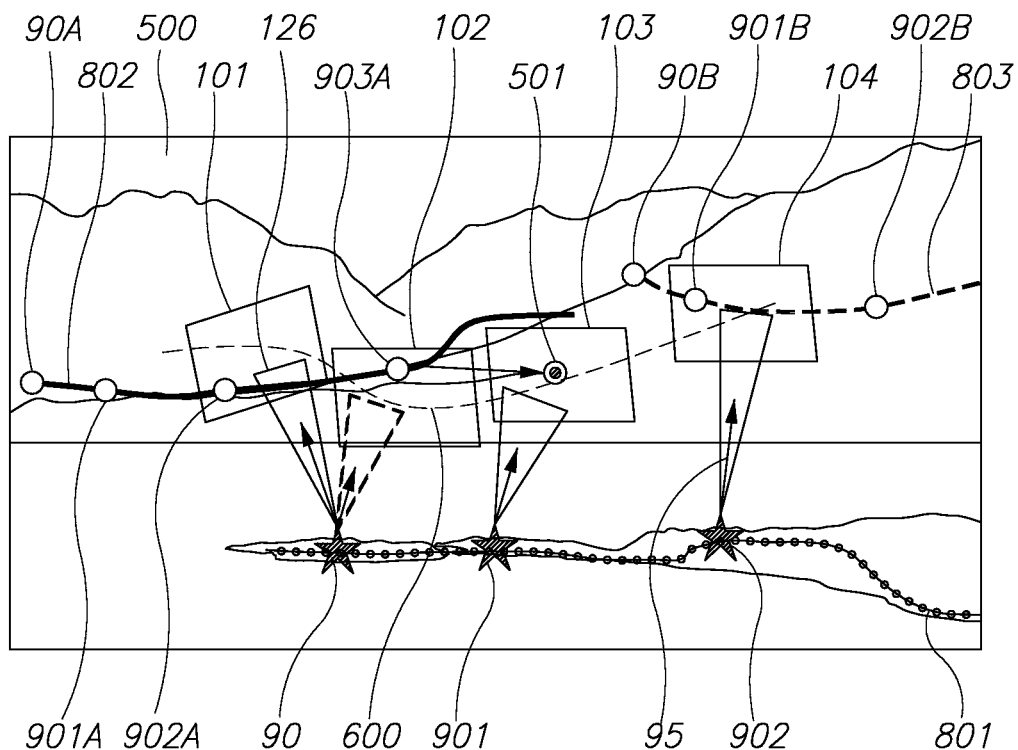
FIGS. 4 and 5 are high level schematic illustrations of use scenarios, according to some embodiments of the invention.
Figure 5:
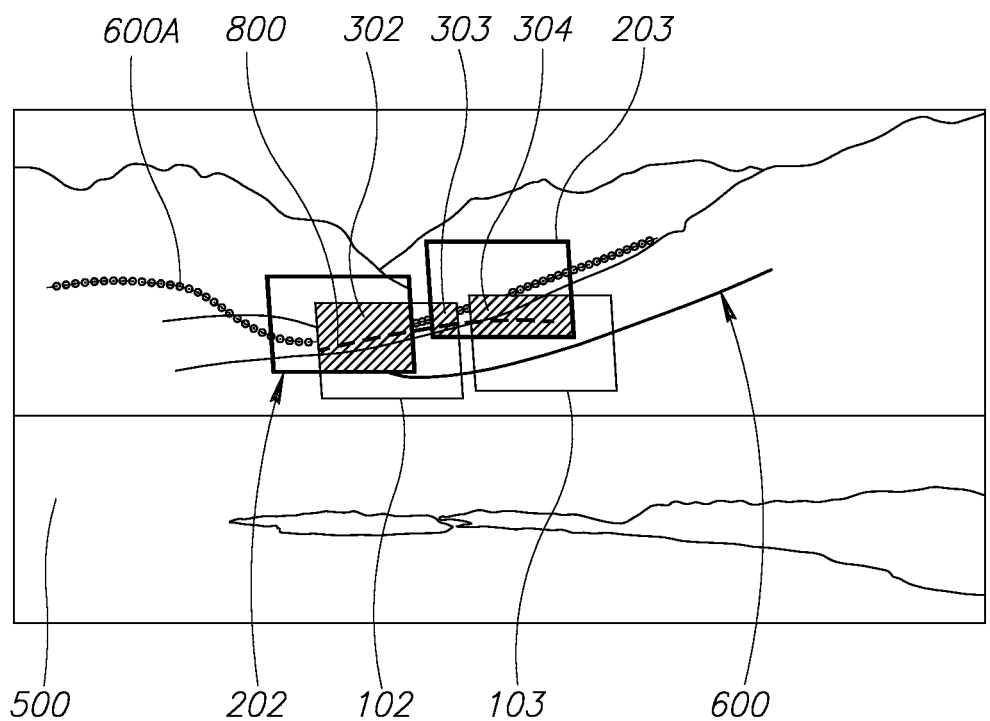

FIGS. 4 and 5 are high level schematic illustrations of use scenarios, according to some embodiments of the invention. FIGS. 4 and 5 illustrate schematically configurations and predefined rules for delivering specified data from a user 90 with wearable device 110 to other wearable device(s) of respective user(s), according to a relation between a position of the other wearable device(s) and the calculated LOS. FIGS. 4 and 5 illustrate schematically a path 801 travelled by user 90 and the LOS'S and viewing sectors of user 90 along path 801; and path(s) of other user(s) with corresponding data delivery spatio-temporal intervals determined according to the predefined rules. It is noted that data delivery may depend on the P&O of the transmitting user, but only on specific place(s) and time(s) are users are present in (and their relation to the user's P&O) but not necessarily on the other's users' orientation and LOS. FIGS. 4 and 5 are perspective views from being user 90.

As illustrated in FIG. 4, with user 90 being a focal (e.g., transmitting) user traveling on path 801 and passing through positions 901, 902 with wearable device 110 having component 111 positioned in front. Component 111 defines viewing sector 126 centered around LOS 95. Component 111 is configured to capture data 101, 102, 103, 104 of scenery 500 along path 801, with each of the captured data 101, 102, 103, 104 being taken and associated with specific related data such as time tag(s), position(s), geographic coordinates, line of sight (LOS), FOV, remarks of users, point(s) of interest, audio recordings etc. Captured data 101, 102, 103, 104 ... N generates a trace line 600 of component 111 along the path of user 90. User 90A and user 90B are illustrated in a non-limiting manner as traveling on paths 802, 803, with both users belonging to a communication group 91 and being associated with focal user 90. The paths of user 90A and 90B intersect sector 126 of user 90 at different times and different locations according to the tempo-spatial relations between the movements of the users. Captured data 101, 102, 103, 104 may be delivered to other users according to tempo-spatial relations between focal user 90 sector 126 coverage and other users' positions. In some embodiments, only positions such as 902A, 903A of user 90A and 901B of user 90B which intersect sector 126 of user 90 and corresponds to the tempo-spatial relations may be used to initiate data transfer of captured data 101, 102 to user 90A and captured data 104 to user 90B, while captured data 103 may not be delivered to any of the users.

In certain embodiments, the data captured or generated by user 90 along path 801 may be divided into a plurality captured data parts and could be associated with specific related data as part of the process of data capturing. The plurality captured data parts may be associated with specific related data and by evaluating the tempo spatial relation to other user(s) a specified data may be generated. The specified data may be transferred to a specific user based on predefined rules, the predefined rules may relate to the relative tempo-spatial relation between receiving user(s) 90A, 90B and focal user 90. As illustrated in a non-limiting manner the predefined rules may be a threshold indicating the distance of user 90A from the center of captured data 101 or a time threshold which may indicate the relation between the time captured data 101 was taken and the time user 90A was in position 902A, as illustrated the predefined rules may indicate which specified data should be transferred to other specific user.

In certain embodiments, user 90A in position 903A may designate using LOS 95 a point of interest 501 in scene 500, a point of interest 501 intersects user's 90 sector 126, according to predefined rules and tempo-spatial relation between point of interest 501 and captured data 103 data captured 103 may be transfer to user 90A, data transfer may be initiated on site or after the trip ends. Designation point 501 may be selected on site using LOS 95 or after trip ended by selecting points on path of user 90A or other points of interest based on trace line 600 of user 90. Trace line 600 may be displayed for the communication group 91 in relative tempo-spatial relation to each user of group 91. In certain embodiments, trace line 600 may be displayed to user 90A only in parts where user 90A coordinates and time domain corresponds to the coverage of component 111 in this way user 90A may select locations along the trace line to deliver specified data.

As illustrated in FIG. 5, trace line 600 of user 90 shows the recorded coverage of component 111 around LOS 95 of device 110 along path 801, trace line 600A of user 90A shows the recorded coverage of component 111 around LOS 95 of other device 110A. The intersection between the users trace lines 600 and 600A generates an overlap trace line 800 in this overlap trace line the information of both users 90, 90A captured by devices 110 at different times or taken simultaneously increases the amount of data captured on same scene 500. A remote server or a local device may be configured to calculate all the different trace lines of different users and may display a single trace line 600, multiple trace lines 600, 600A or an overlap trace line 800 for a user to select manually or automatically according to predefined rules. The overlap trace line may change in size and shape according to the number of the users trace lines which are used to generate overlap trace line 800. The display may be filtered according to overlap of two devices, three device and so forth to N devices. Using the overlap trace lines allows the users to receive specified data from other devices based on location intersection and multiple devices coverage of captured data from different device components 111. It is noted that the illustrated examples may be generalized and applied to any number of devices, including a large number of devices and users (e.g., tens or even hundreds of devices and users).

Figure 6:
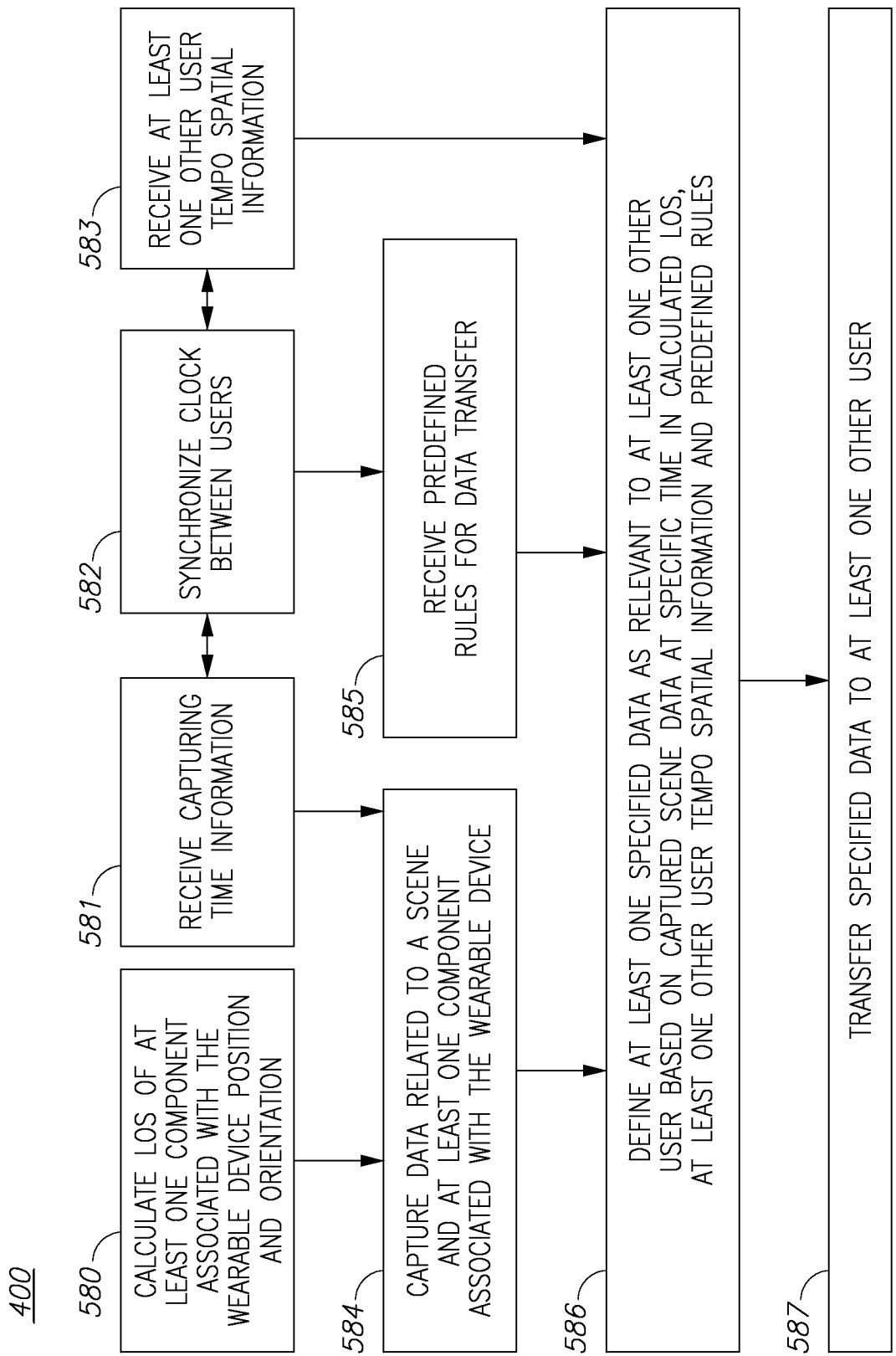
FIG. 6 is a high level schematic flowchart illustrating elements of the method, according to some embodiments of the invention.

FIG. 6 is a high level schematic flowchart illustrating of a method 400, according to some embodiments of the invention. Data processing stages of method 400 may be carried out at least partially by at least one processor, data transferring between users may be carried by different communication hardware components. The method stages may be carried out with respect to system 100 described above, which may optionally be configured to implement method 400. Method 400 may be implemented at least as part of method 200, and/or stages from methods 200, 400 may be combined in various embodiments of the invention. Method 400 may be at least partially implemented by at least one computer processor. Certain embodiments comprise computer program products comprising a computer readable storage medium having computer readable program embodied therewith and configured to carry out of the relevant stages of method 400. Method 400 may comprise stages for producing, preparing and/or using system 100, such as any of the following stages, irrespective of their order.

Method 400 may comprise receiving or deriving a position of a wearable device, the wearable device being associated with a user who is a member of at least one communicating group of users with respective wearable devices, and calculating a device axis orientation of the wearable device with respect to an axis of a reference frame. Method 400 further comprises calculating a LOS of at least one component mounted on the wearable device with specified P&O and/or the LOS of the device itself (stage 580), carried out with respect to the scene, and based on the calculated device axis orientation of the wearable device and on the specified P&O of the at least one component. Method 400 may comprise receiving the capturing time of at least one component mounted on the wearable device and may indicate a time stamp to the captured data (stage 581).

Method 400 may further comprise receiving at least one other user position and orientation at different locations and time (stage 582) hence tempo spatial information of at least one other user. Method 400 may further comprise synchronization of clocks between users who are member of at least one communication group of users with respective wearable devices (stage 583).

Method 400 may comprise capturing data related to a scene using at least one component associated with the wearable device, the data may comprise an audio recorded or an image or video from a plurality of images captured by and received from one or more wearable devices in the at least one communicating group (stage 584), Method 400 may receive predefined rules for data transfer, the predefined rules may relate to at least one of: a distance to the other wearable device, an angular relationship between the other wearable device and the calculated LOS, e.g., according to specified sector definitions, an identity of the other user, a status of the other user within the at least one communicating group of users, a priority of the other user, and a priority related to the specified to tempo-spatial parameters of users that relate to the captured data.

Method 400 may define at least one specified data as relevant to at least one other user (stage 584) based on captured scene data information captured in stage 584 which may relate the captured data to tempo spatial information received from stage 580 and 582, further more method 400 may define at least one specified data as relevant to at least one other user based on the other user tempo spatial information received in stage 583 which may be relative to captured data tempo spatial information or absolute tempo special data.

Method 400 may further transfer specified data to at least one other user (stage 587) the data transfer may be accomplished by any communication hardware available for short range or long range communication such as Bluetooth, WIFI, cellular and others.

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A wearable device, associated with a user being a member of at least one communicating group of users with respective wearable devices, the wearable device comprising:
    a position and orientation (P&O) module which receives or derives a position of the wearable device, and calculates:
        a device axis orientation of the wearable device with respect to an axis of a reference frame, and
        a line of sight (LOS) of at least one component with specified P&O, associated with the wearable device, the LOS calculation being carried out with respect to a scene, and based on the calculated device axis orientation of the wearable device and on the specified P&O of the at least one component, and
    a communication module which delivers specified data to at least one other wearable device of a respective at least one other user of the at least one communicating group,
    wherein the communication module delivers the specified data conditionally upon predefined rules and entering of the LOS of at least one of the other wearable devices to a region that was previously or is currently covered by a sector defined by a specified angle with respect to the calculated LOS and/or by a specified distance with respect to a position of the wearable device, and
    wherein said specified angle and/or said specified distance defining said sector are dynamically adjustable the calculated LOS and predefined rules.

2. The wearable device of claim 1, wherein the predefined rules relate to at least one of: a distance to the other wearable device, an angular relationship between the other wearable device and the calculated LOS, an identity of the other user, a status of the other user within the at least one communicating group of users, a priority of the other user, a priority related to the specified data, and temporal parameters relating to each thereof.

3. The wearable device of claim 1, further comprising an image capturing module configured to capture at least one image along the LOS, wherein the delivered specified data comprises the at least one image.

4. The wearable device of claim 3, further comprising an image processing software configured to enable processing of the at least one image prior to its delivery.

5. The wearable device of claim 1, wherein the at least one component is a sensor and the LOS is calculated with respect to a specified sector of an angular range of the sensor.

6. The wearable device of claim 1, wherein the P&O module is configured to derive the position of the wearable device.

7. The wearable device of claim 1, wherein the P&O module comprises an inertial tracker.

8. The wearable device of claim 1, further comprising a display with a graphical user interface (GUI), configured to display a location of an at least one other wearable device and the specified data, and to enable selection of recipient users.

9. The wearable device of claim 1, wherein the predefined rules are received from an application to which all wearable devices are connected.

10. The wearable device of claim 1, configured as a head-mounted device having the LOS parallel to a LOS of the user wearing the device.

11. The wearable device of claim 1, further comprising a tracker configured to track a LOS of the user, wherein the P&O module is configured to use the tracked user's LOS in place of the calculated component LOS.

12. The wearable device of claim 1, wherein the delivering of the specified data with respect to the calculated LOS is carried out at a specified angle with respect to the LOS and/or at a specified distance with respect to a position of the wearable device.

13. A system comprising a plurality of the wearable devices of claim 1, and a management application in communication with the communication modules in the other wearable devices, which is configured to manage the sending of data streams comprising the specified data among the communication modules according to the predefined rules.

14. The system of claim 13, wherein the devices further comprise respective image capturing modules configured to capture at least one image along the respective LOSs, and wherein the management application is further configured to compose a composite image or video from a plurality of the captured images received from one or more wearable devices according to tempo-spatial parameters of users that relate to the captured images.

15. The system of claim 14, wherein the management application is further configured to compose the composite image or video with respect to at least one of: a specified user, a specific captured image, a tempo-spatial trail, and a location.

16. The system of claim 14, wherein the management application is further configured to provide editing and sharing abilities concerning parts of the composite image or video.

17. The system of claim 1, wherein the management application is further configured to define and manage the users' predefined rules with respect to the delivering of the specified data.

18. The system of claim 17, wherein the management application is further configured to evaluate spatial relations among multiple P&O's and LOS's and send the data streams accordingly.

19. A method comprising:
    receiving or deriving a position of a wearable device, which is associated with a user being a member of at least one communicating group of users with respective wearable devices, calculating a device axis orientation of the wearable device with respect to an axis of a reference frame, calculating a line of sight (LOS) of at least one component with specified position and orientation (P&O), associated with the wearable device, the LOS calculation being carried out with respect to a scene, and based on the calculated device axis orientation of the wearable device and on the specified P&O of the at least one component, and delivering specified data to at least one other wearable device of a respective at least one other user of the at least one communicating group, wherein the delivering of the specified data is carried up only upon predefined rules and entering of the LOS of at least one of the other wearable devices to a region that was previously or is currently covered by a sector defined by a specified angle with respect to the calculated LOS and/or by a specified distance with respect to a position of the wearable device, and wherein said specified angle and/or said specified distance defining said sector are dynamically adjustable.

20. The method of claim 19, wherein the predefined rules relate to at least one of: a distance to the other wearable device, an angular relationship between the other wearable device and the calculated LOS, an identity of the other user, a status of the other user within the at least one communicating group of users, a priority of the other user, a priority related to the specified data, and temporal parameters relating to each thereof.

* * * * *